(12) United States Patent
White et al.

(10) Patent No.: US 6,227,355 B1
(45) Date of Patent: May 8, 2001

(54) SANITARY CONVEYOR APPARATUS

(75) Inventors: James E. White, Everton, MO (US); Gregory A. Roepka, Hutchinson, KS (US)

(73) Assignee: Stainless Steel Systems, Inc., South Hutchinson, KS (US)

(*) Notice: Subject to any disclaimer, the term of this patent is extended or adjusted under 35 U.S.C. 154(b) by 0 days.

(21) Appl. No.: 09/317,912

(22) Filed: May 24, 1999

(51) Int. Cl.[7] .................................................. B65G 15/16
(52) U.S. Cl. ................................................................. 198/841
(58) Field of Search ............................................. 198/841

(56) References Cited

U.S. PATENT DOCUMENTS

| | | | |
|---|---|---|---|
| 559,370 | * 5/1896 | Dodge | 198/841 |
| 1,401,336 | * 12/1921 | Sargent | 198/841 |
| 4,545,477 | * 10/1985 | Besch | 198/841 |
| 4,742,907 | 5/1988 | Palmaer . | |
| 4,898,272 | * 2/1990 | Swinderman et al. | 198/841 |
| 4,932,516 | * 6/1990 | Andersson | 198/841 |
| 4,951,809 | * 8/1990 | Boothe et al. | 198/841 |
| 5,314,059 | 5/1994 | Clopton . | |
| 5,316,134 | 5/1994 | Donohue . | |
| 5,355,994 | 10/1994 | Foster . | |
| 5,419,426 | 5/1995 | Foster . | |
| 5,454,467 | 10/1995 | Lago . | |
| 5,593,019 | 1/1997 | Schlagel . | |
| 5,601,180 | 2/1997 | Steeber et al. . | |

OTHER PUBLICATIONS

Nolu Guide spec sheet re: "Conveyor Guide Rails".
Valu Engineering spec sheet re: "Standard 'Tee' Rail Profiles".

* cited by examiner

Primary Examiner—Thomas J. Brahan
(74) Attorney, Agent, or Firm—Hovey, Williams, Timmons & Collins

(57) ABSTRACT

A conveyor apparatus (10) is provided having a conveyor frame (12) and an overlying, shiftable conveyor belt (14). The frame (12) includes elongated side members (48, 50) supporting a series of transversely extending, axially spaced metallic supports (22) each equipped with openings (56) therein. A series of synthetic resin slide bars (16–20) are received within associated support openings (56), and are maintained in place by keepers (24) attached to corresponding supports (22). The slide bars (16–20) are preferably formed of aligned segments (16a, 16b, 18a, 18b, 20a, 20b). The slide bars (16–20) bridge the spaced apart supports (22) and thus become belt-supporting structural members in the frame (12). The support openings (56) are preferably slightly larger than the associated slide bars (16–20), so as to permit passage of cleaning fluid between the adjacent slide bar and support surfaces.

22 Claims, 2 Drawing Sheets

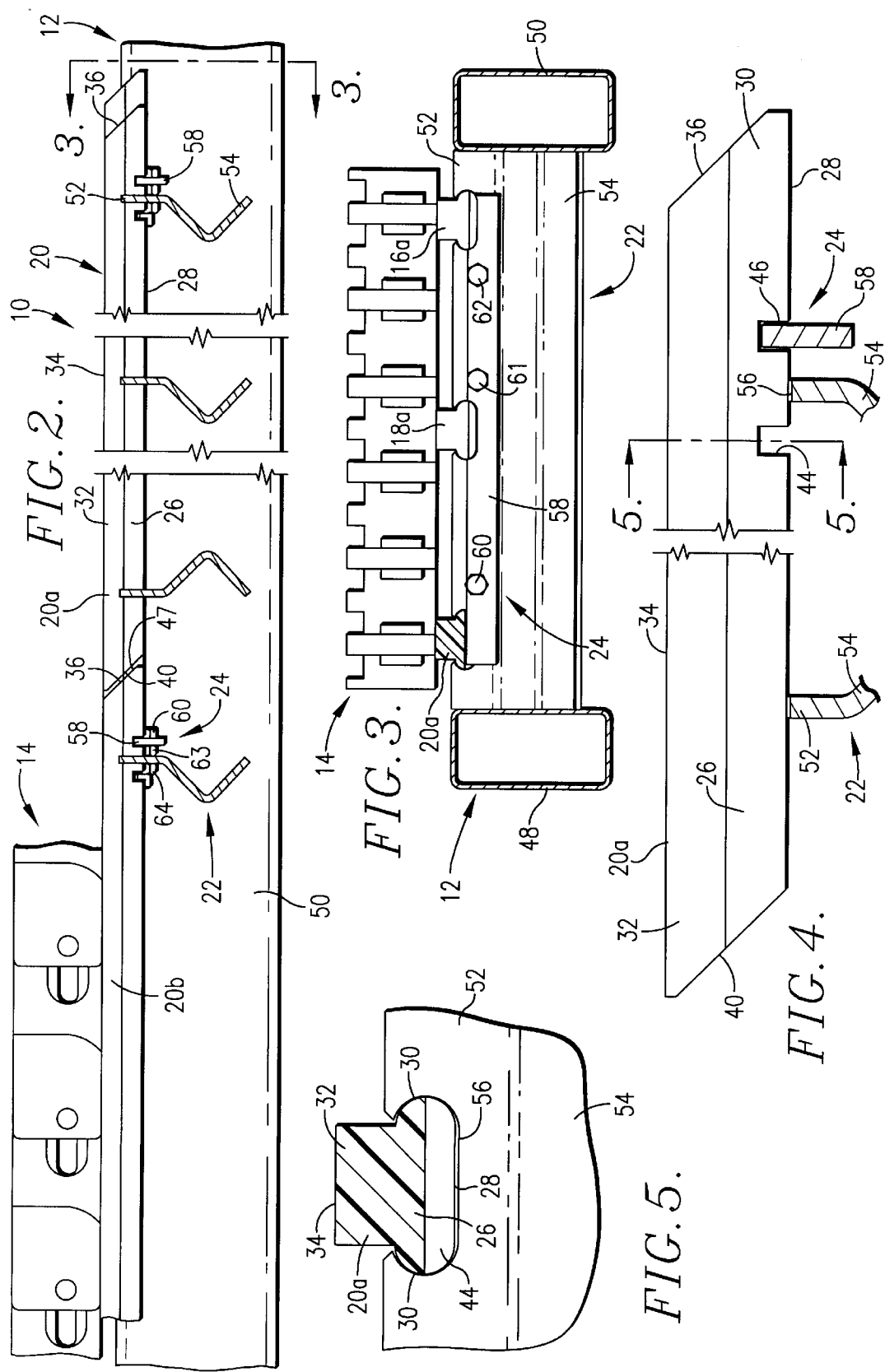

SANITARY CONVEYOR APPARATUS

BACKGROUND OF THE INVENTION

1. Field of the Invention

The present invention is broadly concerned with improved conveyor apparatus including an underlying conveyor frame preferably having synthetic resin belt-supporting slide bars supported at spaced locations so that the slide bars bridge the underlying supports and are themselves structural members supporting a conveyor belt. The conveyor frame preferably is designed so that the components thereof can be sanitized without the need for any frame disassembly.

2. Description of the Prior Art

Typical conveyors include an underlying frame assembly which supports a movable conveyor belt. Such frame assemblies often include elongated, synthetic resin slide bars having uppermost flat surfaces designed to permit belt movement therealong. Such slide bars are commonly supported throughout their full length by means of upright rigid metallic plates or legs so that the plates or legs form the structural support for the belt, with the slide bars primarily serving as low-friction, non-structural, wear members. For example, U.S. Pat. No. 4,742,907 describes a conveyor frame having a series of elongated, laterally spaced apart synthetic resin wear strips supported throughout the length thereof by upstanding metallic plates.

Such prior conveyor designs suffer from a significant problem when used in food plants or in other uses requiring a high degree of cleanliness. For example, the use of plastic wear strips supported throughout their full length by metallic supports inevitably creates unsanitary conditions because of the extreme difficulty in cleaning the regions of interconnection between the supports and wear strips. While theoretically it is possible to remove such wear strips on a daily basis for cleaning, in practice such disassembly represents a significant and time-consuming task, so that in practice, it is only rarely done. Indeed, some food plants using conveyors have been forced to shut down their conveyor lines when confronted by surprise government inspections which found the conveyor frames to be unacceptably unsanitary.

There is accordingly a need in the art for an improved conveyor apparatus which can be more readily cleaned on a periodic or daily basis, without the need for any conveyor frame disassembly.

SUMMARY OF THE INVENTION

The present invention overcomes the problems outlined above, and provides an improved conveyor apparatus including a conveyor frame adapted to slidably support an elongated conveyor belt. The conveyor frame includes a plurality of elongated, laterally spaced apart slide bars together with a number of separate, rigid supports beneath and supporting the slide bars. The supports are axially spaced apart along the length of the slide bars so that segments of the slide bars bridge the supports and thus serve as structural belt-supporting members. The overall frame also includes a keeper releasably attaching each of the slide bars to a corresponding support.

The slide bars are advantageously formed of synthetic resin material and are made up of a number of aligned, end-to-end segments presenting oblique joints therebetween allowing thermal expansion and contraction of the segments. To this end, the respective segments are releasably attached to a support at only a single location.

The slide bar supports are preferably laterally spaced apart, metallic bodies having adjacent their upper ends appropriately configured openings for slidably receiving the slide bars. Preferably, these openings are slightly larger than the associated slide bars so as to permit passage of cleaning fluid between the adjacent slide bar and support surfaces. In practice, supports are designed to facilitate drainage of cleaning fluid from the slide bars and associated structure.

The keepers are preferably in the form of elongated bar elements adapted to be received within associated slots formed in the undersides of the keepers. The bars are releasably attached to an associated support by conventional bolts.

BRIEF DESCRIPTION OF THE DRAWINGS

FIG. 2 is a fragmentary sectional view taking along line 2—2 of FIG. 1 which further depicts the construction of the conveyor frame;

FIG. 3 is a sectional view taken along line 3—3 of FIG. 2 with certain parts shown in section;

FIG. 4 is an enlarged, fragmentary view illustrating a slide bar in accordance with the invention as well as portions of the preferred supports and keeper structure; and FIG. 5 is a vertical sectional view taken along line 5—5 of FIG. 4.

DETAILED DESCRIPTION OF THE PREFERRED EMBODIMENT

Figure 1:
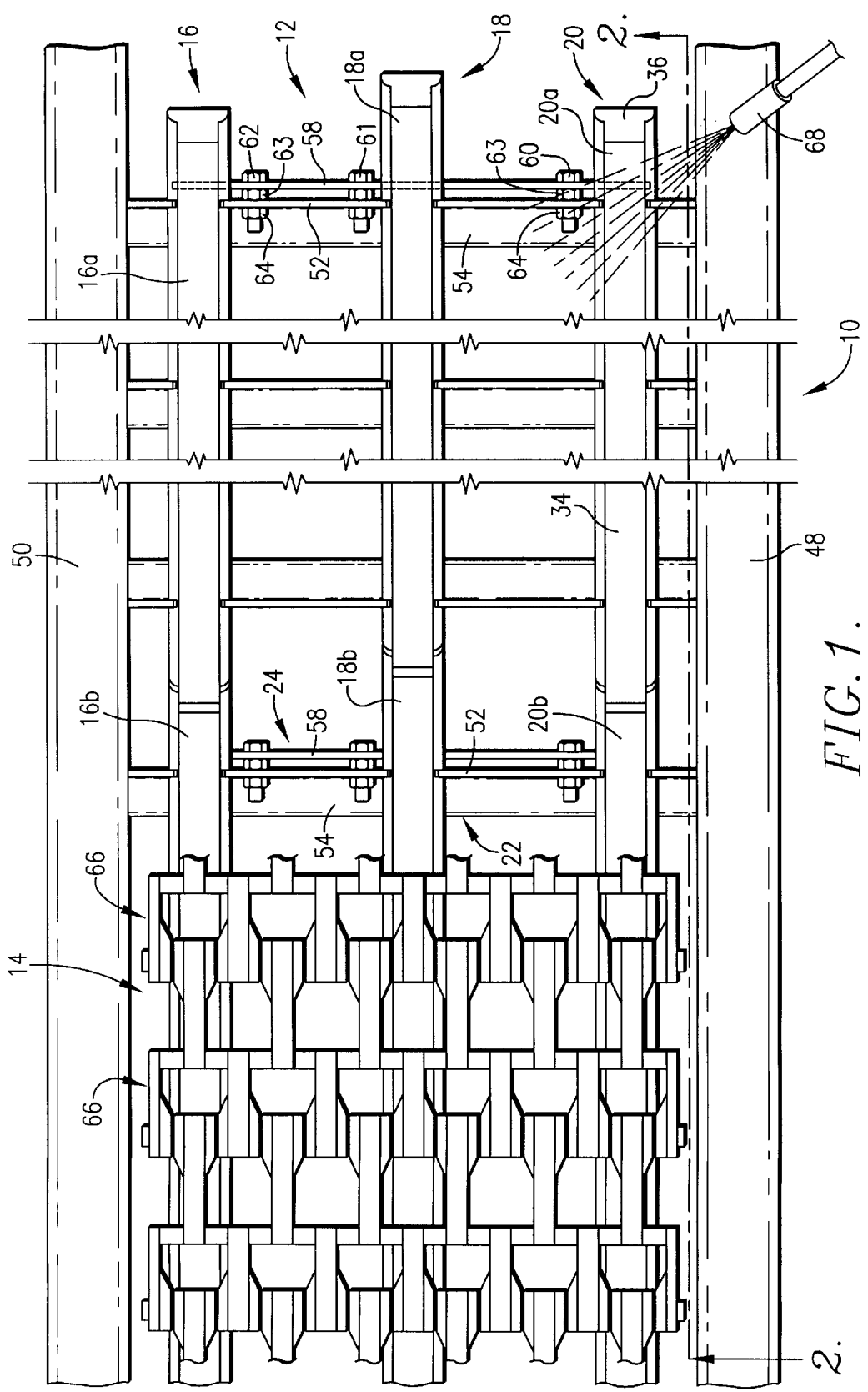
FIG. 1 is a fragmentary top view illustrating the construction of a preferred conveyor in accordance with the invention, showing the conveyor frame and conveyor belt, and a method of spray-cleaning of the conveyor.

Turning now to FIGS. 1–2, a conveyor apparatus 10 in accordance with the invention broadly includes a support frame 12 and an overlying conveyor belt 14. As will be readily appreciated, the frame 12 supports belt 14 so that the latter is movable along the length of the frame.

In more detail, the conveyor frame 12 includes a plurality of elongated, laterally spaced apart slide bars 16, 18 and 20, and a number of separate, axially spaced apart, rigid supports 22 spaced along the length of the slide bars 16–20 with segments of the slide bars bridging the spaced supports 22. The frame 12 also has a series of keepers 24 associated with respective supports 22 for releasably attaching the slide bars 16–20 to a corresponding support 22. It will be understood that the exemplary embodiment depicted in the Figures makes use of three laterally spaced slide bars 16–20 and an appropriate number of supports 22 and keepers 24; however, a smaller or larger number of slide bars and the associated supporting and keeping structure can be used, depending upon the width, length, and load-bearing capacity of a desired conveyor.

Each of the slide bars 16–20 is identical (although they may be made of varying lengths) and made up of axially and end-to-end aligned slide bar segments 16a, 16b . . . , 18a, 18b . . . and 20a, 20b . . . Therefore, only slide bar 20 will be described in detail, with the understanding that the other slide bars are identically configured. In slide bar 20, the axially and end-to-end aligned slide bar segments 20a, 20b . . . cooperatively extend the full length of the frame 12; only two such segments 20a and 20b are illustrated, however. Each of the segments 20a, 20b is in the form of a synthetic resin (preferably extruded high density polyethylene) body presenting a base section 26 having a substantially flat underside 28 and arcuate end surfaces 30, as well as an upper section 32 having a substantially flat slide surface 34. As best seen in FIG. 4, exemplary segment 20a has an oblique front surface 36 and an oblique rear surface 40. Additionally, the segment 20a has a pair of transverse slots 44, 46 formed in the base section 26 as illustrated.

As best seen in FIG. 1, the aligned segments 20a, 20b are positioned so that surface 40 of segment 20a is positioned in close adjacency to the front oblique face 36 of the segment 20b. A small oblique space 47 is thus defined between these surfaces so as to allow for and accommodate thermal expansion and contraction of the segments 20a, 20b.

The slide bars 16–20 are supported by frame components including elongated laterally spaced box beam side members 48, 50 as well as a series of the elongated, transversely extending rigid supports 22. The supports are integral metallic members having an uppermost, substantially vertical, slide bar-receiving section 52 as well as a lower section 54 of generally L-shaped cross-section. The segments 22 are welded to the side members 48, 50. In the embodiment shown, each of the sections 52 of the supports 22 has three laterally spaced slide bar-receiving openings 56 (although fewer than or more than three can be used, depending on the particular application) therein as best seen in FIG. 5. The openings 56 permit selective axial shifting of the slide bars upon release of the keepers 24, so that the slide bars may be replaced as necessary. In addition, the openings 56 are preferably slightly larger than the slide bar received thereby so as to permit passage of cleaning fluid between the adjacent slide bar and support surfaces.

The keepers 24 are in the form of elongated rectangular bars 58 which are releasably bolted to a respective support 22. For this purpose, the support 22 associated with the keepers 24 have a plurality of spaced apart bolt openings therethrough (not shown). The keepers 24 are secured to the associated support 22 by means of bolts 60, 61, and 62 which extend through the bar 58 and the adjacent keeper 22. Preferably, each bolt 60 has a spacer nut 63 threaded thereon which is located between the bar 58 and the associated keeper 22, as well as a locking nut 64. Referring to FIG. 4, it will be observed that the bar 58 is inserted within slot 46 of the segment 20a; the slot 44 could equally be used for this purpose as will be explained.

Preferably, each of the segments 20a, 20b is locked at only a single location by an associated bar 58, such as adjacent the forward ends of each segment as best seen in FIG. 2. Such single point locking of the segments 20a, 20b permits thermal expansion and contraction in an axial direction, this being accommodated by the spacing 47 between the segments. In addition, it is preferred to stagger adjacent slide bars 16, 18 and 20 by using different ones of the locking slots 44 and 46. Thus, as will be appreciated from a study of FIG. 1, the locking bar 58 is received within the slots 46 of the slide bar segments 16a and 20a, whereas the bar is received within the slot 44 of segment 18a. This provides increased smoothness during conveying by preventing aligned slide bar joints across the entire width thereof.

The conveyor belt 14 directly overlies the frame 12 and is supported for movement along the length of the latter by the slide bar 16–20. That is, the underside of the belt 14 engages the upper slide surfaces 34 of the slide bar segments. The belt 14 can be any suitable metallic, synthetic resin, or natural material belt. One such belt is of the type described in U.S. Pat. No. 4,742,907, incorporated by reference herein. This belt 14 is made up of interconnected plastic modules 66 which cooperatively present a continuous, movable belt. As those skilled in the art will readily appreciate, the belt 14 can be driven by any conventional means, such as by sprocket wheels engaging belt 14. The conveyor apparatus 10 provides a number of advantages not heretofore available in conveyor constructions. First of all, use of the synthetic resin slide bar 16–20 as structural members largely eliminates the unsanitary conditions of conventional conveyors having rigid supports extending the fill length of and connected with slide bars. Moreover, because of the somewhat "loose" fit between the slide bar segments and the supports 22, power washing equipment can be used to clean the conveyor without the necessity of disassembly thereof. As illustrated in FIG. 1, a power washer nozzle 68 can be directed towards the components of frame 12 to properly clean them without the need for removing the slide bar segments. Finally, the single point attachment of the slide bar segments and the spacings 47 therebetween accommodates thermal expansion and contraction encountered during use.

Those skilled in the art will appreciate that modifications could be made to the foregoing description that would still be within the scope of the invention. For example, box beam side members 48, 50 could be replaced with side members of another shape, such as round side members or channel side members. Furthermore, rigid supports 22 could be formed of plastic rather than metal. Finally, although supports 22 have lower sections 54 which are disclosed as being of generally L-shaped cross-section, supports 22 could also be formed to be tubular in shape as well as box-shaped.

We claim:

1. A conveyor apparatus comprising:
   a conveyor frame including
      a plurality of elongated, laterally spaced apart slide bars, each formed of a plurality of axially aligned segments; and
      a number of separate, rigid supports beneath and supporting said slide bar segments, said supports being spaced apart along the length of the slide bars with said segments of said slide bars between the supports bridging adjacent supports,
      each of said supports having a slide bar segment-receiving opening therein for receiving at least a portion of a corresponding slide bar segment, said openings being sufficiently larger than the received slide bar segment so as to permit passage of cleaning fluid between the adjacent slide bar segment and support surfaces,
      each of said slide bar segments being attached to only a single one of said supports whereby the slide bars may undergo thermal expansion and contraction in an axial direction; and
   an elongated conveyor belt located above said slide bars and movable along the length of said conveyor frame.

2. The conveyor apparatus of claim 1, further including a keeper releasably attaching each of said slide bar segments to a corresponding support.

3. The conveyor apparatus of claim 2, said supports comprising metallic bodies oriented transverse to the longitudinal axes of said slide bars.

4. The conveyor apparatus of claim 3, said supports including openings therein for receiving each of said slide bar segments, and for permitting selective axial shifting of the slide bars relative to the supports upon release of said keeper.

5. The conveyor apparatus of claim 3, said metallic bodies presenting an upright, slide bar segment-receiving section and a lower section of generally L-shaped cross-section.

6. The conveyor apparatus of claim 2, said slide bar segments each presenting an opening in the underside thereof, said keeper releasably insertable in said opening.

7. The conveyor apparatus of claim 6, wherein said slide bar segments present a plurality of openings in the underside thereof, said keeper being releasably insertable in each of said openings for adjusting the positions of said slide bars in the axial direction.

8. The conveyor apparatus of claim 6, said keeper comprising an elongated bar releasably attached to a support, said opening comprising a slot, said bar received in said slot.

9. The conveyor apparatus of claim 1, said slide bar segments being formed of synthetic resin material.

10. The conveyor apparatus of claim 1, said slide bar segments presenting a lower base segment and an upper conveyor belt-supporting segment.

11. The conveyor apparatus of claim 1, said frame further including a pair of elongated, laterally spaced apart side members, said supports extending between and operably coupled to said side members.

12. A conveyor frame comprising:
   a plurality of elongated, laterally spaced apart slide bars, each formed of a plurality of axially aligned segments; and
   a number of separate, rigid supports beneath and supporting said slide bar segments, said supports being spaced apart along the length of the slide bars with said segments of said slide bars between the supports bridging adjacent supports,
   each of said supports having a slide bar segment-receiving opening therein for receiving at least a portion of a corresponding slide bar segment, said openings being sufficiently larger than the received slide bar segment so as to permit passage of cleaning fluid between the adjacent slide bar segment and support surfaces,
   each of said slide bar segments being attached to only a single one of said supports whereby the slide bars may undergo thermal expansion and contraction in an axial direction.

13. The conveyor frame of claim 12, further including a keeper releasably attaching each of said slide bar segments to a corresponding support.

14. The conveyor frame of claim 13, said supports comprising metallic bodies oriented transverse to the longitudinal axes of said slide bars.

15. The conveyor frame of claim 14, said supports including openings therein for receiving each of said slide bar segments, and for permitting selective axial shifting of the slide bars relative to the supports upon release of said keeper.

16. The conveyor frame of claim 14, said metallic bodies presenting an upright, slide bar segment-receiving section and a lower section of generally L-shaped cross-section.

17. The conveyor frame of claim 13, said slide bar segments each presenting an opening in the underside thereof, said keeper releasably insertable in said opening.

18. The conveyor of claim 17, wherein said slide bar segments present a plurality of openings in the underside thereof, said keeper being releasably insertable in each of said openings for adjusting the positions of said slide bars in the axial direction.

19. The conveyor frame of claim 17, said keeper comprising an elongated bar releasably attached to a support, said opening comprising a slot, said bar received in said slot.

20. The conveyor frame of claim 12, said slide bar segments being formed of synthetic resin material.

21. The conveyor frame of claim 12, said slide bar segments presenting a lower base segment and an upper conveyor belt-supporting segment.

22. The conveyor frame of claim 12, said frame further including a pair of elongated, laterally spaced apart side members, said supports extending between and operably coupled to said side members.

* * * * *